May 28, 1929.     J. J. LONG     1,715,241
THROAT, NOSE, AND LIP GUARD
Filed Dec. 9, 1927     2 Sheets-Sheet 1
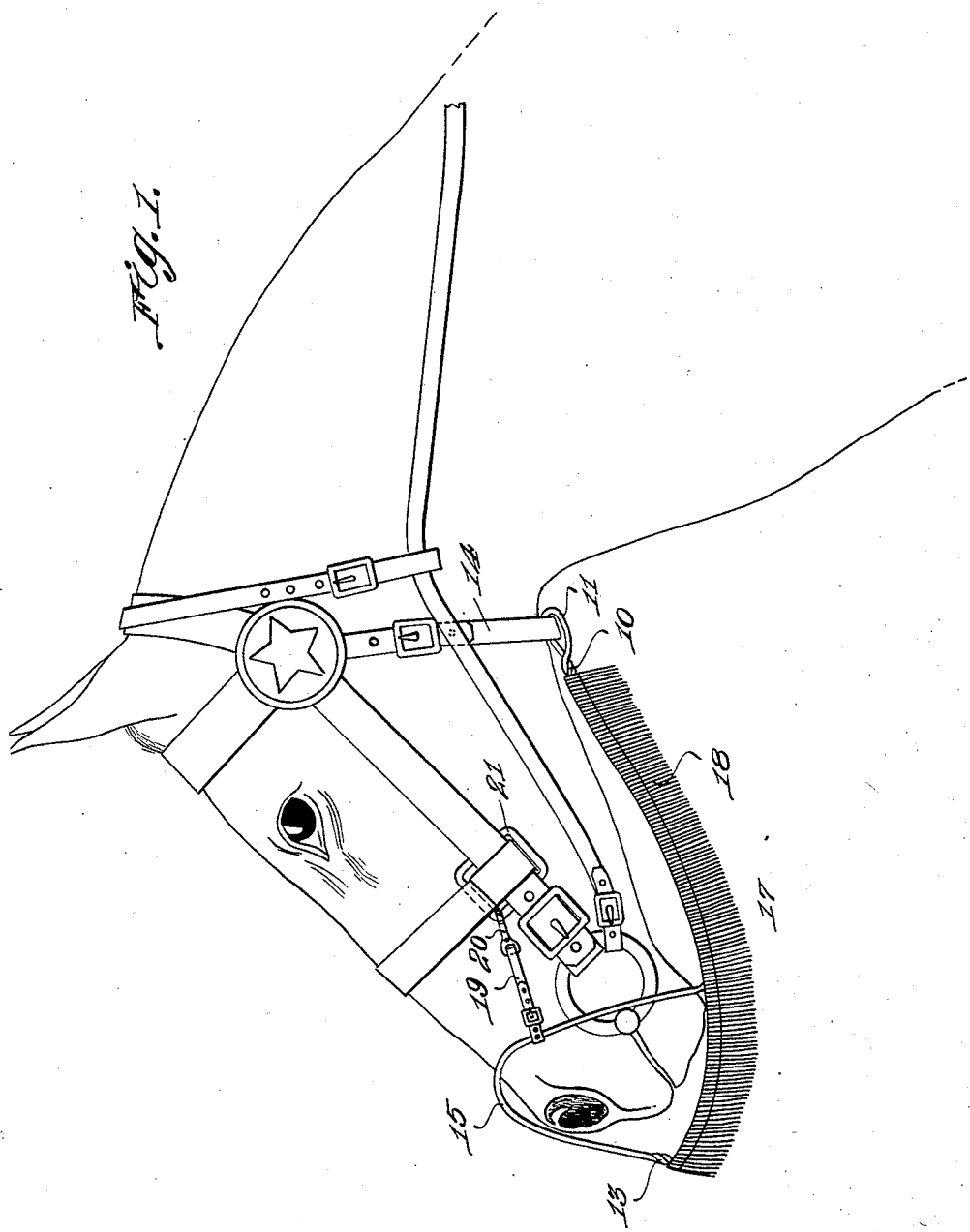
J. J. Long, INVENTOR
BY Victor J. Evans
ATTORNEY May 28, 1929.　　　　J. J. LONG　　　　1,715,241
THROAT, NOSE, AND LIP GUARD
Filed Dec. 9, 1927　　　2 Sheets-Sheet 2
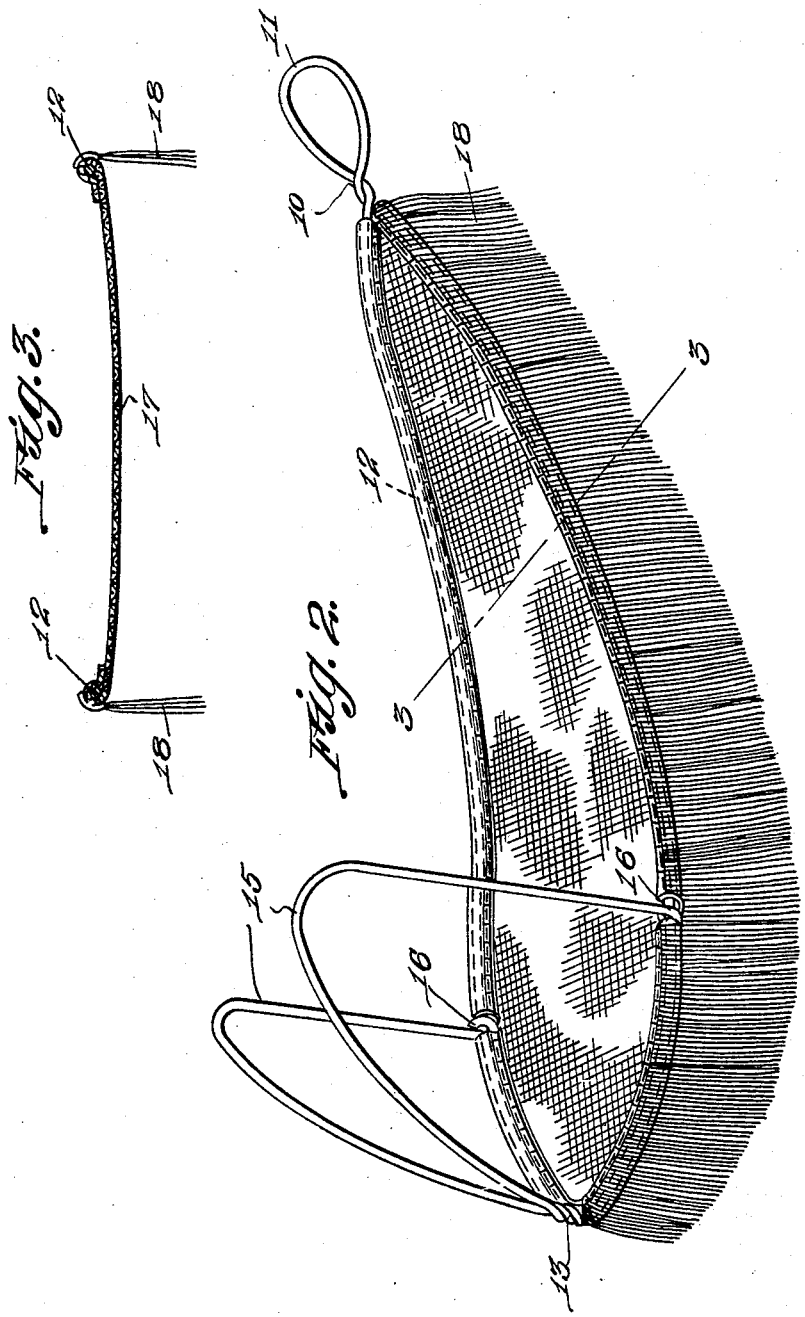

Patented May 28, 1929.

1,715,241

UNITED STATES PATENT OFFICE.

JAMES J. LONG, OF MELVIN, ILLINOIS.

THROAT, NOSE, AND LIP GUARD.

Application filed December 9, 1927. Serial No. 238,960.

This invention relates to protecting devices for animals and has for an object the provision of a throat, nose and lip guard which is especially adapted for protecting horses from nose and bat flies, which attack the animal beneath the nose and lower lip, and which are especially numerous through the Middle Western States.

Another object of the invention is the provision of a guard for this purpose which will effectually function for the purpose intended, and which will provide free ventilation and permit the animal to breathe freely.

Another object of the invention is the provision of a device, which in addition to the above and other advantageous features, is simple in construction and may be cheaply made, the frame of the device being preferably made from a single length of wire.

With the above and other objects in view, the invention further includes the following novel features and details of construction, to be hereinafter more fully described, illustrated in the accompanying drawings and pointed out in the appended claim.

In the drawings:—

Figure 1 is an elevation showing the invention in position for use.

Figure 2 is a perspective view of the device per se.

Figure 3 is a section taken substantially on the line 3—3 of Figure 2.

Referring to the drawings in detail wherein like characters of reference denote corresponding parts, the invention which is adapted to be positioned beneath the lower jaw of an animal, embodies a frame preferably formed from a single length of wire. For this purpose, the wire is bent intermediate its ends and twisted as at 10 to provide a closed loop 11. The wire is then extended to provide arms 12 which are divergent and which are connected at their outer ends by twisting the wire together as shown at 13. The arms are slightly curved and are of a length to permit of the loop being suspended from the throat latch 14 of a horse's bridle and to extend outward beyond the nose of the horse and beneath the lips. The material is then formed into upwardly disposed oppositely extending loops 15 which are closed by connecting the material to the side arms as indicated at 16.

The arms 12 and loops 15 provide a frame whose major portion includes the arms 12, and these arms are covered and connected by a material 17. This material may be of any suitable character such as fabric, leather, solid metal or wire cloth, the purpose being to provide protection for the lower jaw, lips and nose of the animal so that flies and other insects which attack the animal from beneath the jaw will be warded off. A skirt or fringe 18 preferably extends downward from around the edges of the frame.

As previously stated, the throat latch 14 extends through the loop 11, while the loops 15 are attached to the bridle or halter by means of straps 19. These straps preferably carry snap hooks 20 which may engage a buckle 21 carried by the bridle or any other convenient means. For this purpose, the straps 19 are preferably adjustable.

It will be seen from the foregoing description and accompanying drawings that the invention provides a throat, nose and lip guard which will afford protection to the animal against the attacks of insects and which will not interfere with his free breathing, as does some of the devices for this purpose now in use.

The invention is susceptible of various changes in its form, proportions and minor details of construction and the right is herein reserved to make such changes as properly fall within the scope of the appended claim.

Having described the invention what is claimed is:—

An animal protecting device comprising a frame adapted to be positioned beneath the lower jaw and to extend from the throat beyond the nose of the animal, said frame being formed of a single length of material bent centrally to provide a loop to receive the throat latch of a bridle, said material extending divergently outward to provide side arms connected at their outer ends, and upwardly disposed loops formed by the extended ends of the side arms, said loops having one of their ends extending from the connected ends of the side arms and their other ends secured to said arms, a cover for the outwardly extending portion of the frame, and means extending from the upwardly disposed loops for detachable connection with a bridle.

In testimony whereof I affix my signature.

JAMES J. LONG.